US007339141B2

(12) United States Patent
Mister et al.

(10) Patent No.: US 7,339,141 B2
(45) Date of Patent: Mar. 4, 2008

(54) SYSTEM AND METHOD FOR MONITORING HEAT SEAL DEVICES

(75) Inventors: Edgar J. Mister, Stewartstown, PA (US); Douglas R. VanTassel, Bethlehem, PA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 11/531,120

(22) Filed: Sep. 12, 2006

(65) Prior Publication Data
US 2007/0000901 A1 Jan. 4, 2007

Related U.S. Application Data

(62) Division of application No. 10/699,422, filed on Oct. 31, 2003, now Pat. No. 7,117,912.

(51) Int. Cl.
*H05B 1/02* (2006.01)
(52) U.S. Cl. .................. 219/497; 219/494; 219/491; 156/359; 156/378; 53/477; 53/77
(58) Field of Classification Search ........ 219/483–486, 219/497, 501, 494, 491; 153/351, 358–362, 153/378, 379; 53/51, 52, 75, 77, 477, 473; 156/351, 358–362, 378, 379
See application file for complete search history.

(56) References Cited

U.S. PATENT DOCUMENTS 4,454,704 A * 6/1984 Ullman .................... 53/76

| 4,722,168 | A | 2/1988 | Heaney |
| 5,323,005 | A | 6/1994 | Merkel |
| 5,582,663 | A | 12/1996 | Matsunaga |
| 5,678,390 | A | 10/1997 | Pruett et al. |
| 6,035,604 | A | 3/2000 | Gustafsson |
| 6,342,264 | B1 | 1/2002 | Raterman et al. |

FOREIGN PATENT DOCUMENTS

JP     11156676     6/1999

OTHER PUBLICATIONS

Nordson Corporation, Seal Sentry Series 10 Bead Detection System, Brochure, 2001 (2 pages).
US Patent and Trademark Office, Office Action in U.S. Appl. No. 10/699,422, filed Jan. 4, 2005, 14 pages.
US Patent and Trademark Office, Office Action in U.S. Appl. No. 10/699,422, filed Mar. 29, 2006, 15 pages.

* cited by examiner

*Primary Examiner*—Mark Paschall
(74) *Attorney, Agent, or Firm*—Wood, Herron & Evans, LLP

(57) ABSTRACT

An apparatus for monitoring the operation of a heating element moving periodically along a predefined path includes first and second sensors positioned adjacent the path of the heating element. The first sensor is configured to sense the presence of the heating element proximate to the second sensor, and the second sensor is configured to sense a temperature associated with the heating element as is passes by the second sensor. A controller receives signals from the first and second sensors and performs a control function such as indicating when the temperature sensed by the second sensor fall outside a predetermined range.

6 Claims, 1 Drawing Sheet

SYSTEM AND METHOD FOR MONITORING HEAT SEAL DEVICES

This application is a divisional of U.S. patent application Ser. No. 10/699,422, filed Oct. 31, 2003 now U.S. Pat. No. 7,117,912 (now pending), the disclosure of which is incorporated by reference herein in its entirety

TECHNICAL FIELD

The present invention relates generally to heat sealing devices, and more particularly to an apparatus for monitoring the operation of a heat sealing device.

BACKGROUND

Many consumer goods are provided in sealed packages such as heat-sealed polymeric bags. When the packaged goods are perishable goods such as cereal, crackers, or other foodstuffs, it is important that the package be properly sealed to keep the goods fresh and to avoid spillage and contamination of the goods. One type of sealing device used to seal polymeric bags utilizes one or more heater blocks provided on a rotating belt. The blocks cooperate with an adjustable press plate whereby the open end of a polymeric bag positioned between the press plate and rotating belt is sealed as a heater block passes the plate. Advantageously, the speed of the belt and the spacing of the blocks on the belt can be set to correspond to the timing of filled bags provided to a sealing station including the press plate and heater blocks such that continuous sealing of bags in a production line may be accomplished.

One drawback of this type of bag sealing system is that many improperly sealed bags may pass through the sealing station without detection when one or more of the heater blocks fail. The improperly sealed bags must either be reworked or the product in the improperly sealed bags disposed of. In either case, the inability to detect failed heater blocks results in waste and increased manufacturing costs. In the worst case, the improperly sealed bags may pass through the manufacturing system undetected, ultimately resulting in unsatisfied customers.

There is thus a need for an apparatus and method for monitoring the operation of a heat sealing device so that failure of one or more of the heating elements may be detected.

SUMMARY

The present invention provides an apparatus for monitoring the operation of a heating device, such as a device for heat sealing polymeric bags, having one or more heating elements moving with periodic motion along a predefined path. The apparatus includes first and second sensors located adjacent to the path of the heating elements. The first sensor is configured to detect the presence of a heating element as it passes, and the second sensor is configured to sense a temperature associated with the passing heating element. This may, for example, involve sensing and communicating the actual temperature of the heating element or elements to a controller for various monitoring purposes and/or purposes related to taking corrective actions. It may alternatively or additionally involve detecting when the temperature is below a lower limit or above an upper limit for the particular heating element. Other implementations of the inventive principles can involve monitoring the temperature of the heating element(s) over time to detect rising or falling temperatures of the element(s) prior to actually reaching the upper or lower temperature limits established for that type of element. This would allow maintenance or replacement of the element(s) prior to actual failure. Temperatures of different elements in the same apparatus also could be monitored and compared to indicate a potential problem with one or more of the elements.

The apparatus further includes a controller in communication with the sensors. The controller monitors the sensors and provides an indication when the temperature sensed by the second sensor falls outside of a predetermined range. The controller can perform other functions, such as those mentioned above, as well. The monitoring apparatus alerts operators to faulty operation of the heating elements so that the heating elements can be inspected and problems can be corrected in a timely fashion.

In another aspect of the invention, an apparatus for sealing bags includes a sealing station having a press plate and a heating element configured to move past the press plate in a periodic fashion to seal bags passing between the press plate and heating element. A sealing station monitor has first and second sensor positioned adjacent to the path of the heating element to detect the passage of the heating element and a temperature associated with the heating element. A controller monitors the sensors and performs a control function such as, for example, providing an indication if the temperature of the heating element falls outside a predetermined range, whereafter the sealing process can be stopped and any problems with the heating element corrected. The process may be stopped by an operator alerted by the indication from the controller, or the controller may be configured to automatically stop the process.

In another aspect of the invention, a method of monitoring the operation of a heating element moving along a predefined path includes sensing the presence of the heating element with a first sensor, sensing the temperature associated with the heating element with a second sensor performs a control function for determining whether a faulty heating element exists. This may be, for example, indicating when the temperature sensed by the second sensor falls outside a predetermined range or other desirable functions. The method is particularly applicable to the bag sealing apparatus discussed above, but can have other applications as well.

These and other features, objects and advantages of the invention will become more readily apparent to those of ordinary skill in the art upon review of the following detailed description, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
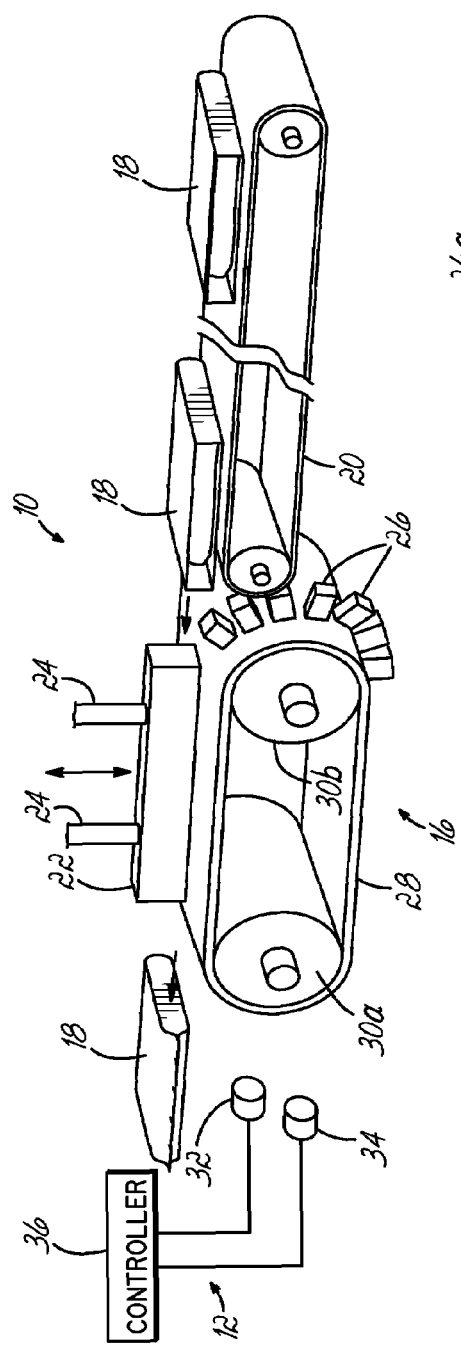
FIG. 1 is a schematic illustration depicting a bag seal system including an exemplary heating device monitor of the present invention.

Referring to FIG. 1, there is shown a bag fill and seal system 10 including an exemplary sealing station monitor 12 according to the present invention. The fill and seal system 10 includes a bag fill machine (not shown) and a sealing station 16 downstream from the bag fill machine. After bags 18 are filled with one or more articles, such as foodstuffs or other products, whereafter individual bags 18 are transported along a conveyer 20 to the sealing station 16 to seal the open end of the bags 18. Sealing station 16 includes a press plate 22 mounted, for example, to vertical supports 24 such that the position of the press plate on the supports 24 may be adjusted as desired. Sealing station 1 6 further includes one or more heater blocks 26 provided on a rotating belt 28. The belt 28 is carried by rollers 30a, 30b such that heater blocks 26 are caused to pass in close proximity to press plate 22 as belt 28 rotates. As the open end of a bag 18 passes beneath press plate 22, the pressure between heater blocks 26 passing by press plate 22, in conjunction with the heat from the heater blocks 26, seals the open end of the bag 18.

Sealing station monitor 12 includes first and second sensors 32, 34 located adjacent the path of heater blocks 26 on belt 28. The first sensor 32 is configured to detect the presence of a heater block 26 as it passes the first sensor 32. In an exemplary embodiment, the first sensor is an optical sensor. However, it will be recognized that the first sensor may alternatively be selected from various other types of sensors, such as eddy current sensors, or any other proximity sensor capable of detecting the presence of a heater block 26 as it passes the first sensor 32. Second sensor 34 is configured to sense the temperature of a heater block 26 as it passes second sensor 34.

First and second sensors 32, 34 communicate with a controller 36 and transmit signals to the controller 36 related to the detection of a heater block passing by the first sensor 32 and the temperature detected by the second sensor 34. Controller 36 monitors the signals from the first and second sensors 32, 34 and checks to see whether the temperature sensed by second sensor 34 falls outside a predetermined range. When the temperature sensed by second sensor 34 exceeds or falls below the predetermined range, controller 36 indicates a failure of the sealing station 1 6 so that operators can stop the fill and seal system 10 and correct problems with the heater blocks 26, as may be required. Alternatively, controller 36 may be configured to automatically stop the fill and seal system 1 0 when a problem with the heater blocks 26 is detected. Controller 36 may perform various other control functions using information obtained from temperature sensor 34. As examples, controller 36 may monitor rising or falling temperatures of each heater block 26 during operation which, even if within the specified temperature range, could indicate a failing heater block 26. Also, by comparing temperatures of different heater blocks 26 in a group and performing statistical analysis, a heater block 26 having a temperature statistically outside of the others could be checked and appropriately serviced prior to actual failure. In one embodiment, the controller 36 comprises a Seal Sentry™ Bead Detection System available from Nordson Corporation of Westlake, Ohio.

Figure 2:
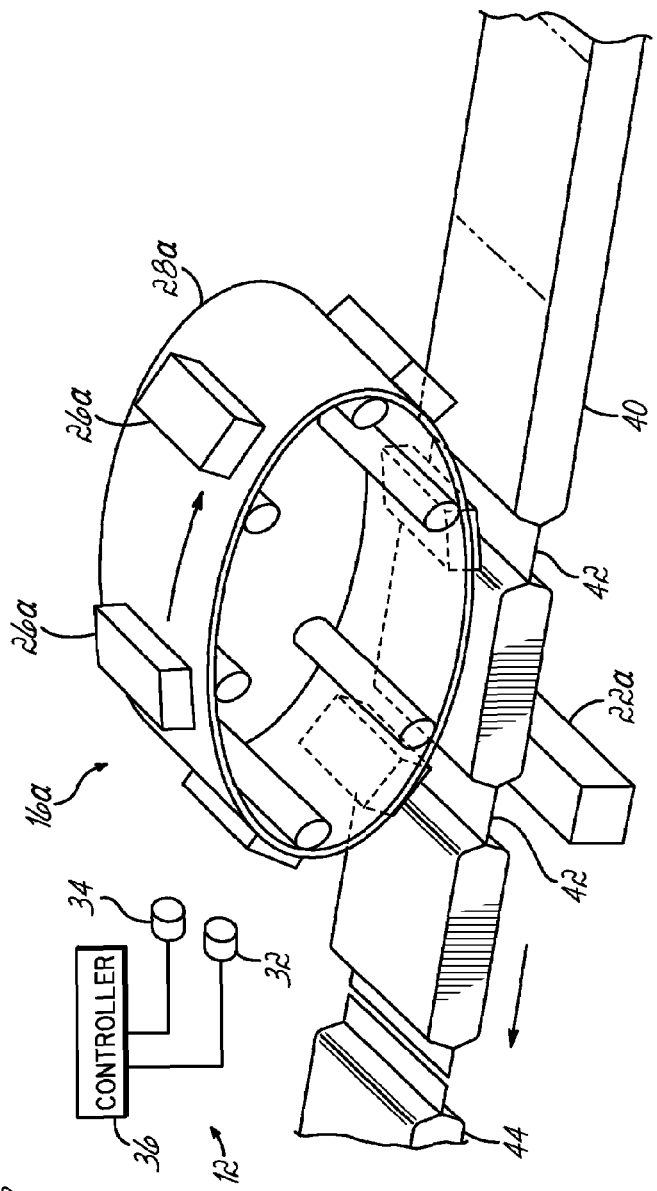
FIG. 2 is a schematic illustration depicting an alternate embodiment of the bag seal system.

Referring now to FIG. 2, there is shown an alternative bag seal arrangement, similar to that shown in FIG. 1 wherein the sealing station 16a is configured to seal articles within packaging material provided to the sealing station 16a as a continuous tube or web 40. In this embodiment, individual heater blocks 26a are spaced at predetermined intervals around the belt 28a to correspond to desired locations on the tube or web 40 where a seal 42 is to be formed. The sealed area of the tube or web 40 may be subsequently cut, or otherwise separated, to form individual sealed packages 44. As a heater block 26a is carried past the first and second sensors 32, 34 by rotating belt 28a, the first sensor 32 senses the presence of the heater block 26a and the second sensor 34 senses the temperature of the heater block 26a. Controller 36 monitors signals from the first and second sensors 32, 34 and checks to determine whether the temperature sensed by second sensor 34 falls outside a predetermined range. When the temperature sensed by second sensor 34 exceeds or falls below the predetermined range, controller 36 indicates a failure of the sealing station 16a so that the sealing process can be stopped and problems with the heater block 26a addressed, as described above.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A method of monitoring the operation of a heating device having at least one electrically heated heating element moving periodically along a predefined path, the method comprising:
   sensing the presence of the heating element with a first sensor;
   sensing a temperature associated with the heating element with a second sensor when the first sensor senses the presence of the heating element; and
   sending a control signal in response to the temperature sensed by the second sensor.

2. The method of claim 1, wherein sending the control signal further comprises:
   sending the control signal when the temperature sensed by the second sensor deviates from a predetermined range.

3. The method of claim 1, further comprising:
   sensing temperatures associated with a plurality of heating elements;
   comparing the sensed temperatures associated with the plurality of heating elements; and
   sending a control signal in response to the comparison made between the sensed temperatures associated with the plurality of heating elements.

4. The method of claim 1, further comprising:
   sensing temperatures associated with the heating element over time;
   comparing the sensed temperatures associated with the heating element over time; and
   sending a control signal in response to the comparison made between the sensed temperatures associated with the heating element over time.

5. A method of monitoring a bag sealer having one or more electrically heated heater blocks moving periodically along a predefined path in proximity to a press plate, the method comprising:
   moving the heater block along the path and past the press plate;
   feeding a bag having an open end to the bag sealer;
   sealing the open end of the bag;

sensing the presence of the heater block with a first sensor;

sensing a temperature associated with the heater block with a second sensor when the first sensor senses the presence of the heater block; and sending a control signal in response to the temperature sensed by the second sensor.

6. The method of claim 5, further comprising stopping the movement of the heater block when the temperature sensed by the second sensor deviates from the predetermined temperature range.

* * * * *